United States Patent
Mackie et al.

(10) Patent No.: US 10,408,647 B2
(45) Date of Patent: Sep. 10, 2019

(54) ANALYSIS OF PIPE SYSTEMS WITH SENSOR DEVICES

(71) Applicant: Olea Networks, Inc., Bee Cave, TX (US)

(72) Inventors: David Mackie, Austin, TX (US); Stefan Grefen, Nierstein (DE); Corey James Boelter, Round Rock, TX (US); Astrid Jaehde, Austin, TX (US)

(73) Assignee: Olea Networks, Inc., Bee Cave, TX (US)

( * ) Notice: Subject to any disclaimer, the term of this patent is extended or adjusted under 35 U.S.C. 154(b) by 0 days.

(21) Appl. No.: 15/433,603

(22) Filed: Feb. 15, 2017

(65) Prior Publication Data
US 2017/0238072 A1    Aug. 17, 2017

Related U.S. Application Data

(60) Provisional application No. 62/295,287, filed on Feb. 15, 2016, provisional application No. 62/418,952, filed on Nov. 8, 2016.

(51) Int. Cl.
| | |
|---|---|
| *G01F 1/60* | (2006.01) |
| *G01D 4/00* | (2006.01) |
| *G01F 1/075* | (2006.01) |
| *G01F 1/56* | (2006.01) |
| *G01M 3/28* | (2006.01) |
| *H04Q 9/00* | (2006.01) |
| *G01M 3/24* | (2006.01) |

(52) U.S. Cl.
CPC ............... *G01F 1/60* (2013.01); *G01D 4/002* (2013.01); *G01D 4/004* (2013.01); *G01D 4/006* (2013.01); *G01D 4/008* (2013.01); *G01F 1/075* (2013.01); *G01F 1/56* (2013.01); *G01M 3/243* (2013.01); *G01M 3/2807* (2013.01); *G01M 3/2815* (2013.01); *H04Q 9/00* (2013.01); *H04Q 2209/60* (2013.01); *H04Q 2209/86* (2013.01); *H04Q 2209/886* (2013.01); *Y02B 90/247* (2013.01); *Y04S 20/50* (2013.01)

(58) Field of Classification Search
CPC ........ G01D 4/004; H04Q 9/00; G01M 3/2807
See application file for complete search history.

(56) References Cited

U.S. PATENT DOCUMENTS

| | | | |
|---|---|---|---|
| 2007/0124090 A1* | 5/2007 | Henry .................. | G01F 1/8404 702/45 |
| 2016/0214852 A1* | 7/2016 | Collins ................. | B67D 7/222 |
| 2016/0261115 A1* | 9/2016 | Asati ...................... | H02J 3/14 |

(Continued)

*Primary Examiner* — Laura N Nguyen
(74) *Attorney, Agent, or Firm* — Egan Peterman Enders Huston

(57) ABSTRACT

An infrastructure and methods for the analysis of flow in pipe systems. In a preferred form, the infrastructure and methods account for energy status of a sensor device and wear cost functions. The infrastructure comprises a controller and a plurality of sensor devices coupled to the pipe system to collect measurements related to one or more of the following: vibration, magnetic field, fluid pressure, temperature, humidity, chemical composition of the fluid, fluid flow or fluid throughput. The controller has access to a database containing one or both of—(i) current energy status of a sensor device and/or (ii) a cost allocation relating to use of a sensor device and assigns workloads using energy status and/or cost.

19 Claims, 3 Drawing Sheets

(56) References Cited

U.S. PATENT DOCUMENTS

2017/0121949 A1\* 5/2017 Fleury, Jr. ............... E03B 7/003
2017/0231071 A1\* 8/2017 Elinsenberg ........... H05B 37/03
2017/0257826 A1\* 9/2017 Kates ....................... G08B 1/08
2017/0261397 A1\* 9/2017 Horne ........................ G01F 1/66

\* cited by examiner

ANALYSIS OF PIPE SYSTEMS WITH SENSOR DEVICES

The present application claims priority to U.S. Provisional Application No. 62/295,287 filed Feb. 15, 2016 and 62/418,952 filed Nov. 8, 2016, which are incorporated by reference.

BACKGROUND OF THE INVENTION

Field of the Invention

In general, the present invention relates to infrastructure and methods for the analysis of flow in pipe systems. In a preferred form, the infrastructure and methods account for energy status of a sensor device and wear cost functions.

Description of the Relevant Art

Recent technological advancements in the realm of IoT and wireless communication make it feasible to design pipe infrastructures that extend across large geographic areas for automated control and monitoring. While digital control has been integrated into the designs of spatially constrained pipe installations for a long time, for instance in factories and chemical processing plants, enabling it for geographically distributed pipe systems is challenging. Control and monitoring devices often need to be installed at locations without access to the electric grid, requiring such devices to function autonomously, on a small energy footprint.

Presently, many efforts are underway to upgrade water meters in municipal water supply systems with so called smart meters. A smart meter is a digitally enabled flow meter, that presents the measured throughput and possibly other data in digital format, is capable of transmitting data by means of a network and enabled for communication and coordination of actions with a management system. Adoption of smart meter technologies though is slow for several reasons, one of them being the lack of maturity of many aspects of IoT technologies. A legacy flow meter, working on a purely mechanical basis, typically has an expected lifespan of 15 years or more. Many electronic components in IoT device fall short of these lifetimes, more so if deployed outdoors, in harsh climate conditions. For instance, a rechargeable Lithium-ion battery has an expected lifetime of three years in hot climates, whereby the temperature exposure is the main factor for battery aging, rather than the number of recharge cycles. Using rewriteable memory or storage devices with a maximum number of program-erase cycles, such as SSD storage devices, requires careful design, to avoid premature wear. Short lifespans of many components, limiting the overall lifetime of the device, or increasing maintenance costs, are one reason for the slow adoption of smart meters. The cost versus benefit analysis presently is not in favor of them.

A legacy flow meter is a flow meter that does not have a digital interface or if it has one, its capabilities does not satisfy the requirements for integration into a system for the management of smart meters. For instance, a flow meter that functions on a purely mechanical basis, or a flow meter that has a digital interface but no capabilities for long range data transmission by means of a network are regarded as legacy flow meters. See U.S. Pat. App., "Retrofit Device and Method of Retrofitting a Flow Meter" filed concurrently herewith (Att. Dock. #5654-0601) (incorporated by reference). This "Retrofit Device" patent application presents the design of a retrofit device for a legacy flow meter, to enable a legacy flow meter with a mean to digitally represent and transmit measurement data. Aside from the cumulative throughput since installation, typically presented on a flow meter, the retrofit device provides the current rate of flow and is equipped with sensors to collect additional measurement data, such as vibration signals measured in proximity of the pipe envelope.

Retrofit devices reduce the adoption cost for smart meter technology, since equipping a legacy flow meter with a retrofit device avoids the costs associated with replacing that flow meter, which would requires interrupting a pipe. Also, retrofit devices reduce the risk associated with the introduction of new technology. In case of a premature failure of a device, replacement costs are smaller, and, moreover, the legacy flow meter that has been retrofitted, still in place, serves as a functional fallback option.

Pipe infrastructures frequently are old and costly to upgrade, and have defects that are hard to diagnose. For instance, in municipal water supply systems, up to 20% of water is assumed to be lost due to leaks in pipes. Yet pipe leaks are difficult and costly to find, and thus this often is not attempted. Another problem are underreporting water meters, caused by wear or a premature failure of parts under adverse conditions. For instance, turbine flow meters may be affected by sediment build-up near the turbine or the occurrence of back pressure in the pipe, which may lead to gradual or sudden failures.

Both leaks in pipes and underreporting flow meters, are difficult to identify. To determine either condition, one needs to essentially measure throughput in a pipe before and after the location where it is suspected. This typically is infeasible or very costly to do, since it requires an interruption of the pipe envelope and insertion of a measurement instrument into the pipe. Leaks in pipes are often diagnosed by means of analyzing vibration signals. This is a manual, labor intense process, requiring the placement of devices that generate or record sound waves in proximity to pipes at probe points.

Having a pipe system comprehensively equipped with smart devices, capable of capturing measurement data and transmitting them in digital format, allows for large scale data collections, concurrently at many measuring points. Such data might be used for the detection of water leaks or defects in flow meters, correlating measurement data of multiple types, including the rate of throughput and vibration signals. However, smart meters operate on a limited energy budget, as they are frequently not connected to the electrical grid. Designs of such systems for water leak detection need to take into account the constraints set by a limited battery power and computational capacity.

SUMMARY OF THE INVENTION

The problems outlined above are addressed by one or more of the embodiments of the present invention. In a broad form a system in accordance with the present invention comprises a plurality of sensor devices operatively coupled to the pipe system to collect measurements related to one or more of the following: vibration, magnetic field, fluid pressure, temperature, humidity, chemical composition of the fluid, fluid flow or fluid throughput. Each sensor device of the system has an autonomous power source, a current energy status and a network connector. The system includes a network and a controller, where the network connects a number of said sensor devices through said network connectors to the controller. The controller has access to a database containing one or both of—(i) current energy status of a sensor device, (ii) a cost allocation relating to use of a sensor device. In the system, the controller operates to determine assigned actions to one or more of said number of sensor devices based on one or both of—(i)

maximizing the number of actions performed by said sensor devices based at least in part on current energy status, (ii) said cost allocation relating to use of a sensor device. The controller also operates to command operation of one or more of said number of sensor devices based on said assigned actions by communicating through the network to said sensor devices.

A preferred method operates a network of sensor devices connected to a pipe system transporting a fluid by communicating the energy status of a number of said sensor devices through a network to a controller. The controller schedules an action for one or more sensor devices based at least in part on one or both of—(i) current energy status of a sensor device, (ii) a cost allocation relating to use of a sensor device. The controller then communicates the scheduled action to a sensor device through the network.

Preferably, in the method the scheduled actions of said sensor devices comprises collecting measurements related to one or more of the following: vibration, magnetic field, fluid pressure, temperature, humidity, chemical compensation of the fluid, fluid flow or fluid throughput. In a preferred form the cost allocation is based on a wear schedule of a sensor device before required maintenance and the cost of the required maintenance. In another preferred form, the scheduled actions are used for determining one or more of—back pressure in the pipe system, fluid flow rate at a location in the pipe system, fluid throughput in the pipe system, fluid leaks.

BRIEF DESCRIPTION OF THE DRAWINGS

Other objects and advantages of the invention will become apparent upon reading the following detailed description and upon reference to the accompanying drawings.

DETAILED DESCRIPTION OF THE PREFERRED EMBODIMENTS

In general, the present invention presents a comprehensive infrastructure for the analysis of flow in a pipe system, for the detection of pipe leaks and defects in flow meters. The infrastructure takes into account the limited energy and computational capacity of smart meters or retrofit devices.

A smart meter typically records the cumulative throughput, that is flow volume units that passed the pipe since installation of it, or since its last reset, and also the rate of throughput, which is equivalent to the first derivative of the function that models the cumulative throughput. In addition, it may contain sensors to record further environmental data, such as vibration signals, intra-pipe pressure, chemical properties of the water, air humidity and ambient temperature. A smart meter typically operates autonomously, without an external power supply, and a design point often is that it may be intermittently unavailable. For instance, if a smart meter is solar powered and has exhausted battery power, it will go offline until the solar panels have recharged the batteries.

Figure 1:
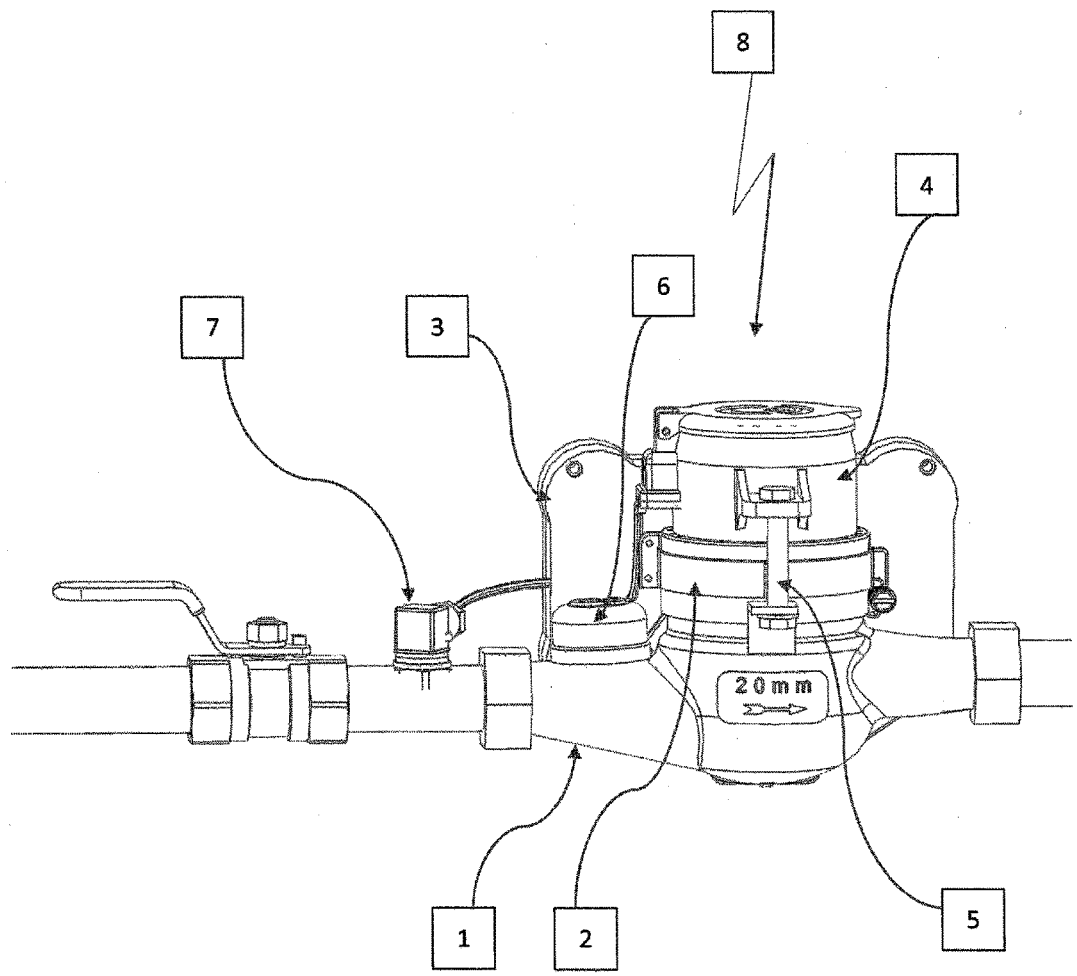
FIG. 1 is a side elevation view of an embodiment of a retrofit device coupled to a legacy flow meter.

FIG. 1 shows a legacy flow meter (1), equipped with a retrofit device (8). The retrofit device (8) is installed on top of the meter display, (2) of the flow meter (1). The casing of the retrofit flow meter is made up of housings (3)(4), containing the majority of electronic components, mounted on the meter display by means of screws (5). Housing (4) contains sensors to read the meter display and observe the function of internal parts of the legacy flow meter for additional information, such as for obtaining the current rate of flow. The retrofit device collects data in addition to measurement data presented by the flow meter, (1). Attachment (6) is mounted to the pipe and contains a vibration sensor. Casing (7) has been installed into the pipe envelope, to expose sensors to the pipe interior. Such installations can be performed safely on-site. Casing (7) for instance may contain a pressure sensor to measure intra-pipe pressure or sensors to measure the chemical properties of the medium in the pipe, such as the salt content of water. The retrofit device (8) typically is equipped with solar panels and a networking device, not shown in FIG. 1, to transmit data, typically a cellular antenna, or devices for other protocols, such as Wireless 802.11, Ethernet, ZigBee, Bluetooth, BLE, USB, or RF signaling.

A retrofit device for a flow meter implements the same essential functions like a smart meter, recording the cumulative and rate of throughput of the medium transported in a pipe, and optionally data collected by further sensors, and being capable of network transmission of these recorded data. In addition, a retrofit device is capable of observing the function of the legacy flow meter which is supplements. For this, it is equipped with sensors to observe the behavior of the legacy flow meter and detect an incorrect functioning of the latter, caused by defects, environmental conditions or tamper attempts. For instance, a retrofit device may monitor the behavior of the magnetic coupling of a flow meter, for the correct mechanical alignment of parts.

Retrofit devices and smart meters provide comparable sets of functions. In the following they are referred to as sensor devices for a pipe infrastructure, or sensor devices. A sensor device is capable of generating measurement values in digital format frequently, on demand, and of storing a set of most recent measurement values. It is enabled to participate in a network architecture, such as an edge network or mesh network. It has sufficient energy reserves to support the network bandwidth required for its operation. A sensor device may collect auxiliary data that may be of interest to the operator of an installation, or to third parties. For instance, it may collect environmental data, such as air temperature or humidity and intra-pipe temperature. A sensor device can be an example of an IoT device.

An important design consideration for IoT devices that are deployed in outdoor locations is longevity. Maintenance costs for a device that is deployed outdoors typically are higher than for a computer that is located in a datacenter. A hardware maintenance task, such as the exchange of battery or storage card involves retrieving the device from the location where it is installed and often also opening and restoring a tamper-proof enclosure. A strategy to increase longevity of an IoT device is to employ components with different aging and wear characteristics and design their utilization to maximize the time span during which a replacement of components is not required.

Figure 2:
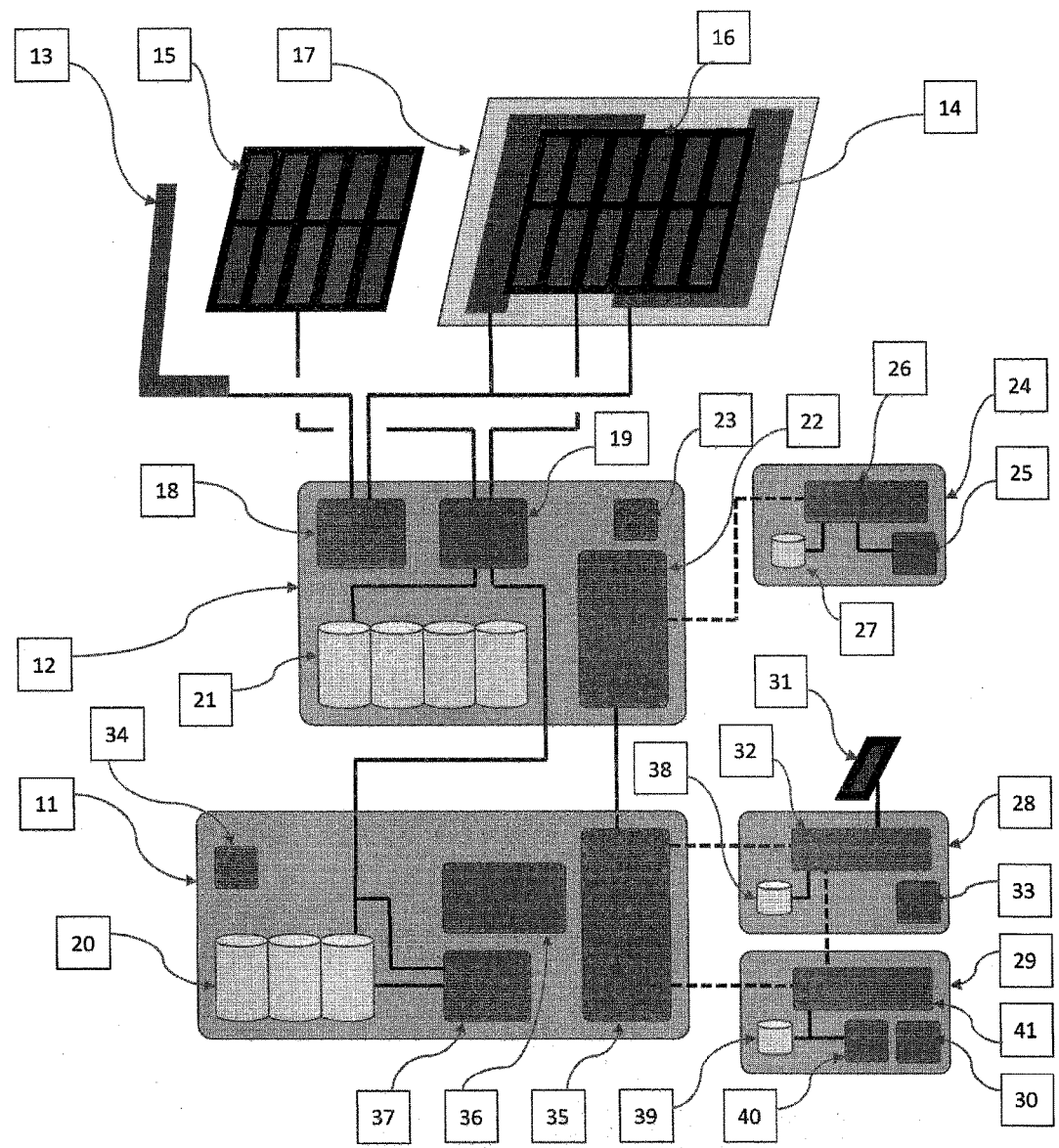
FIG. 2 is a functional diagram of an IoT device having multiple modules.

FIG. 2 shows an example of a component schematics of an IoT device, made up of multiple modules. An IoT device may consist of fewer or more modules than the one shown in FIG. 2, but at least one module. It may have all functions of the device shown in FIG. 2. and described in the following, or a subset of them, and in addition others, not mentioned here. The IoT device in FIG. 2. consists of modules, (11), (12), (24), (28), and (29). Each module contains one or more micro-boards, connected by pins, bridges, cables or similar. A module runs software or firmware; the software and firmware jointly run on all modules implements the functions of the device. Typically, at least one module runs an operating system, such as embedded Linux or a micro-kernel.

Each module may contain one or more controllers. A controller is a functional unit that provides one or more services, for instance encryption, management of electrical power and hibernation state, or hosting an operating system. The function of a controller is realized either by hardware, such as a micro-controller that controls persistent storage, such as an SSD card, by software or firmware that runs on a set of electronic components on one or more micro-boards, or by a combination of both. Multiple controllers may share the same hardware units on a micro-board. For instance, a micro-controller may perform multiple function, such as power management and sensor control, or a System on a Chip, SoC, may perform encryption and host the operating system. Two controllers, residing in separate modules, may act cooperatively to provide a function.

FIG. 2 shows controllers typically required in an IoT device, though a device may implement further ones or not require all that are shown in FIG. 2. Module (11) contains controllers (35), (36) and (37). Controller (35) may implement communication with other components, (12), (18), and (29). Controller (36) may implement encryption and controller (37) may manage the charge state for the batteries, (20), of component (11).

A module may contain one or more sensors. In FIG. 2, module (11) contains a set of sensors (34), module (12) contains a set of sensors, (23), module (24) contains sensor set (25), module (28) contains sensor set (33) and (29) contains sensor sets (30) and (40). Each set of sensor may contain zero or more sensors, of various types. For instance, sensor set (25) may contain pressure and temperature sensors. A given sensor of a sensor set may be controlled by one or more controllers. For instance, in module (11), a sensor of the set of sensors (34) may be controlled by one or more of the set of controllers made up of (35), (36), and (37). In FIG. 2, connections between controllers and other items, such as sensors or batteries, are only shown when it is required to highlight their function. For instance, for module (11), a connection between (37) and batteries (20) is shown. Whereas controller (35) may interact with controllers (36) and (37), and sensors, yet no connection of (35) to the latter is shown.

Module (12) contains controllers (18), (19), and (22). (18) controls antennas (13) and (14) and implements one or more functions for network communication, such as a cellular modem, an Ethernet adapter, or a wireless adapter that runs one or more wireless protocols, for instance cellular LTE, ZigBee, USB, Bluetooth, BLE, or Wireless 802.11. Controller (19) may be a charge controller for the batteries, (21) of module (12), and also for batteries (20) of module (11). Controller (19) is connected to two solar panels, (15) and (16). Alternatively, not shown here, (19) may be connected to the electric grid. An antenna or solar panel may be a standalone unit, (13) or (15), or being contained in an enclosure. For instance, (17) is an enclosure that contains a solar panel, (16) and two antennas, one of which is (14). An antenna, solar panel or enclosure containing both may as well be integrated into a module. For instance, (13), (14), or (17) may be integrated into the casing of module (12). Controller (18) may as well implement a network protocol stack, such as TCP/IP, and security functions, for instance encryption or a block chain based protocol for auditing purposes, as described in "System and Method for Data Management Structure Using Auditable Delta Records in a Distributed Environment," application Ser. No. 15/367,873, filed Dec. 2, 2016 (incorporated by reference) (sometimes referred to herein as "Audit Blockchain application").

A module may be connected to one or more other modules by means of a network connection for communication to coordinate actions and data transfer. The network connection between two modules may be of any architecture suited for use in connections between micro-boards, for instance USB, Ethernet, Wifi 802.11, ZigBee, Bluetooth, BLE, Near-field communication, NFC, or RF signaling. In FIG. 2, a network connection between two modules is depicted as a connection between controllers belonging to these modules. For instance, controller (22) implements communication with other modules, (11) and (24). Controller (35) of module (11) is connected with controller (22) of module (12). Module (29) has a network connection with modules (11) and (28). In a device that contains these components, the connection between (11) and (28) may be USB, Ethernet, Bluetooth, or BLE. Assuming controllers (32) of (28) and (41) of (29) need to communicate occasionally to coordinate actions, (28) and (29) may also communicate by means of an RF based protocol.

Modules (24), (28) and (29) are auxiliary modules, for instance used to control sensors, containing components that cannot be integrated into modules (11) or (12). The requirement for an auxiliary module in the design of an IoT device often arises from conditions at the install site. For instance, due to spatial constraints it may not be possible to place all components of a device into a common enclosure. Also, functional requirements may dictate placing a sensor at a distance to other sensors, or at a location where other modules of the device cannot be placed. For instance, module (24) may contain one or more vibration sensors, in set (25), that need to be in close contact with a pipe of a water supply infrastructure, to detect vibrations, whereas another module of the IoT device needs to be mounted in proximity to a flow meter, hence sensors (24) require a separate module. Controller (26) belonging to module (24), may control the operation of sensor of (25), process signals recorded by them, and communicates with controller (22) by means of a network connection. For instance, module (24) may to correspond to (6) in FIG. 1.

Auxiliary modules may have their own power source, such as batteries, solar panels, or sensors that are used for energy harvesting. For instance, module (28) contains a solar panel, (31), used to recharge its battery, (38), for which controller (32) performs charge control functions. Module (29) may contain a piezoelectric vibration sensor, in set (40), that generates energy which is used to recharge its battery, (39), controller (41) performing charge control.

A module may not have a battery but receive its energy by means of a power supply connection from another module. For instance, module (11) or (24) may not contain battery (20) or (27) respectively, but receive power by means of a power connection, such as a DC line or USB cable from module (12).

A sensor typically is used to measure physical properties associated with objects or the environment in which the sensor is situated. In most cases, for signals generated by one or more sensors, further processing, referred to as signal conversion, is required to arrive at a suitable representation, such as a measurement value for a physical property or a state value for an object. Signal conversion of the signals generated by sensors often is a non-trivial task. For instance, in the design of a retrofit device in the patent application entitled "Retrofit Device and Method of Retrofitting a Flow Meter," magnetic sensors are used to measure the rotation count of a magnetic coupling of a legacy flow meter, to determine the rotation speed of a mechanical part, from which a current rate of throughput of a medium in a pipe is calculated. Signal conversion entails calculating the current rate or throughput of the cumulative rate of throughout from signals of a set of magnetic sensors during a time interval.

Signal conversion for the signals generated by magnetic sensors requires various steps. Typically, this calculation involves a normalization of signals with respect to the magnetic field, the detection of an angular movement, a full rotation or part of it, and building an approximation for the first derivative of the speed of rotation, which, knowing the amount of volume flowing through the pipe corresponds to one rotation, can be translated into a current rate of throughput. Similarly, the cumulative throughput per time interval can be obtained by counting the rotations during that time unit.

A sensor processor associated with a set of sensors is made up of software or firmware to configure these sensors, control their operation, and further process the signals generated by them. Such software and firmware may reside on multiple controllers, that may not all reside on the same module. For instance, sensors (25) in FIG. 2 are electrically connected to controller (26), which records signals generated by sensors (25). (26) may perform further processing of signals of the set of sensors (25), or perform it in conjunction with controller (22) on module (12), and possibly further controllers.

For a set of sensors, their associated sensor processor may perform any subset of steps required in the signal conversion of the signal they generate. It may do none at all, or perform a subset, to arrive at an intermediate representation, such as for magnetic sensors, calculating a rotation speed from recorded signals, or all steps, such as calculating a rate of throughput from the recorded signals of magnetic sensors. For signals recorded by a vibration sensor, the sensor processor associated with it, may perform any subset of steps in signal processing, which for instance may include applying a signal filter, or a Fast Fourier Transformation.

Signals, generated by a set of sensors, given in a representation that is arrived at after the processing of the signals by the sensor processor associated with that set of sensors, are referred to as converted signals, which means no more than the signals are given in a format that is the result of processing them by a sensor processor. Converted signals may be stored or cached on the sensor device or sent to another computing device, such as a server which performs administration functions for a set of sensor devices, and stores data generated by sensor devices in a database. In the following, instead of the term 'converted signal' the term 'measurements generated by a sensor device' or 'signals generated by sensors of a sensor device' may be used. The term 'converted signal' means to stress that a sensor device may send data that require further processing. For instance, instead of sending a rate of throughput, the measurement device may send a rotation count for the turbine of a flow meter and a program that uses the rotation count, is assumed to transform the rotation count into a rate of throughput using knowledge about the flow volume that needs to pass in a pipe to effect one turbine rotation.

An important design consideration to maximize the lifetime of an IoT device is to prevent an early failure of electronic or other components whose lifespan is influenced by usage patterns. For instance, some memory and storage types have a maximum number of erase or rewrite cycles. Most battery types have a maximum lifespan that is determined, among others, by the number of recharge cycles and charge and discharge patterns. The design of an IoT device aims to extend the lifetime of such components by optimizing their usage.

For example, the IoT device shown FIG. 2 may be a sensor device, and the batteries in modules (11) and (12), (20) and (21) respectively, may be of different type. (20) may be a set of Lithium-Ion, Li-ion, batteries and (21) a set of Nickel-Cadmium, NiCd, batteries. The charge controller, (19), is connected to both sets of batteries. The set of sensors (25) of auxiliary module (24) contains vibration sensors and magnetic sensors, and their associated sensor processor runs on controllers (22) and (26). The converted signals generated by sensors of (25) may be stored on (22), or sent to another device by means of communication controller (18). Controller (35) may be the operating system of the sensor device, and controllers (18), (22) and (26) run autonomously, independent of (35), though these controllers may communicate with (35). To save energy, (35) may be in a state of minimal activity while, such as running with a minimal set of threads or in a hibernation state, while controllers (22), (26) and (18) cooperatively process signals recorded by sensors (25), transform them into converted signals and send them. Controllers (35), (36), and (36) on module (11) are supplied with power by batteries (20), and the controllers in (11) and their combined power requirements for most of the time will be minimal, given (35) is most of the time in a state of reduced activity. Batteries (20) will be kept at maximum charge state and since (20) are Li-ion batteries, a deep discharge of them is avoided, because it would reduce battery lifetime. Self-discharge is low for Li-ion batteries, hence they are suited as reliable energy store. Controllers (18), (22), and (26) continually perform a recording of signals generated by sensors (25), process these signals to generate converted signals and send the latter to another computing device. Controllers (18), (22), and (26) perform this task as long as the charge state of (21) permits, and (21) may fully discharge, which is even required to be done for a NiCd battery once in a while, to prevent premature aging. The generation of converted signals from signals recorded by sensors and their forwarding to another server is a low priority task, that is performed gratuitously, as long as energy resources permit. Also, the self-discharge rate for NiCd batteries is high, thus there is little benefit in trying to conserve their power. The design of power management for the IoT device is such that battery (21) is allowed to run empty, while the aim for (20) is to keep it at full charge state. The design thus optimizes the use of battery types, taking into account task priorities and properties of the batteries with regards to wear and aging.

A distributed infrastructure is a set of computing devices that can communicate with each other, to coordinate actions among all or a subset of the computing devices. Examples of computing devices are servers, virtual servers, smart phones, tables, network gateways, routers, switches or edge devices, or IoT devices. Each computing device is connected with at least one other device, by means of a shared network connection, shared storage or shared memory.

Figure 3:
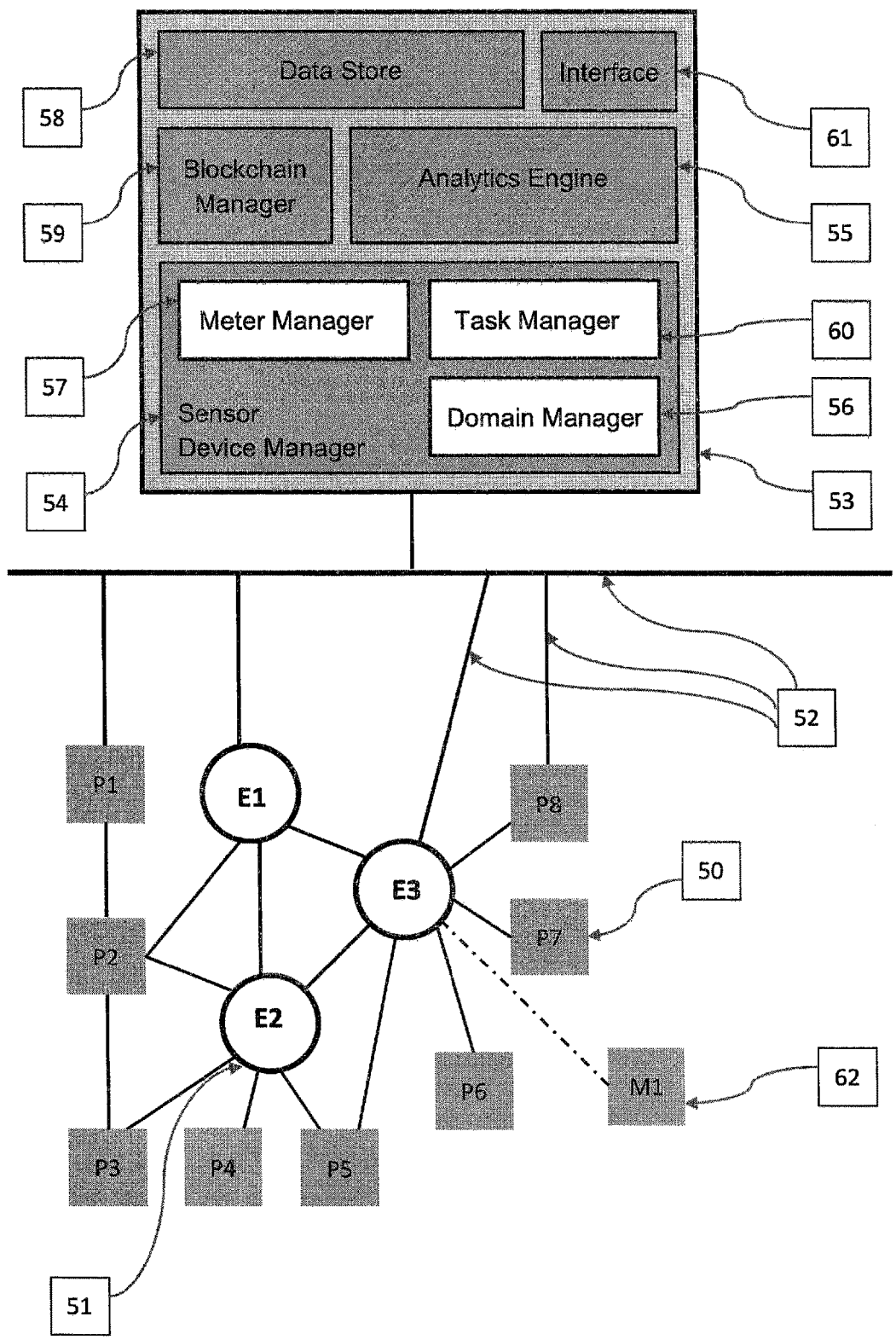
FIG. 3 is a functional diagram of a network of IoT devices connected through a network to a management infrastructure.

A sensor device is capable of participating in a distributed infrastructure, that coordinates the actions of a set of sensor devices and also the further processing of converted signals generated by sensor devices. FIG. 3 shows an example of such distributed infrastructure, and is sometimes called herein the Sensor Device Management Domain. It consists of sensor devices M1, (62), P1, . . . , P8, (50) depicts sensor device P7, and network devices E1, . . . , E3, (51) depicts E2.

A network device E1, . . . , E3 may be for instance a network gateway, router or switch, or a network edge device. A sensor device also may perform functions of a gateway or edge device and forward network traffic. For instance, sensor device P2 is connected to P1 and P3 and may forward traffic from and to them. A sensor device or edge device is connected to a network, possibly by multiple hops, that connects to a Sensor Domain Manager, (53). (52) depicts some network connections of edge devices and sensor devices to a network that connects to (53). The set of network connections between the set made up of devices P1, . . . , P8, edge devices E1, . . . , E3 and sensor domain manager (53) may implement one or more protocols or architectures, for instance cellular LTE, ZigBee, USB, Bluetooth, BLE, Ethernet, Wireless 802.11 or RF signaling.

All or a subset of sensor devices in FIG. 3 may form a peer-to-peer domain. A peer-to-peer domain is an example of a distributed infrastructure that enables for a device that is part of it participating in coordinated actions together with other devices that belong to the peer-to-peer domain. For instance, for sensor devices in a pipe system, such action may be that a device, upon observing a threshold value in a signal generated by one of its sensors communicates with a set of other devices and then the devices perform a coordinated recording of measurement values.

The Sensor Domain Manager (53) is a software that has several functions. It provides for the administration of sensor devices, and implements services for the administration, processing and storage of data generated by the sensor devices. Its set of processes is active on a set of computers that may include for instance servers, virtual servers, tablets and handheld devices. The Sensor Domain Manager (53) consists of multiple subsystems, including at minimum a Sensor Device Manager, (54), and an Analytics Engine, (55).

The Sensor Domain Manager (53) performs all actions that require communication with the sensor devices belonging to the Sensor Device Management Domain. These actions include maintaining a database that records the sensor devices that belong to the Sensor Device Management Domain, and their operational status, perform maintenance actions on then, such as firmware upgrades and collections of diagnostics data. Aforementioned actions may be performed by a component called the Domain Manager (56).

The Sensor Domain Manager (53) may also contain a Meter Manager (57), a component that provides for the management of measurement data that were generated by the sensor devices and forwarded to the Sensor Domain Manager (53). Such measurement data may include the cumulative and current rate of throughput and further data recorded on a device, for instance intra-pipe pressure, vibration signals, and ambient temperature. The Meter Manager (57) provides for the storage of these data in a database, and functions for their administration. The database that contains data maintained by the Meter Manager (57) may be administered by another subsystem, the Data Store (58). Data maintained by the Meter Manager may be stored in blockchain format, described in the Audit Blockchain application, to implement blockchain based auditing. If the Sensor Device Manager implements block chain based auditing, a separate subsystem, the Blockchain Manager (59), may exist that implements functions for it, such as storing the data in blockchain format and administrative functions, such to support an audit of the data, as described in the Audit Blockchain application.

The Sensor Domain Manager (53) also contains the Task Manager (60), a subsystem that manages data collections performed for diagnostic purposes. Such data collection for instance may entail a set of sensor devices recording signals and converting them to measurement values, such as the current rate of throughput from signals generated by magnetic sensors. The Task Manager (60) provides for the administration of such tasks, their scheduling, recording of status, and required communication with sensor devices. The measurement data generated by these data collections are stored in a database that may be maintained by the Data Store (58).

The Analytics Engine (55) implements all methods for the analysis of data generated by sensor devices. An analysis of data may be performed for diagnostic purposes, including the detection of pipe leaks, pipe blockage, and defects in flow meters. The Analytics Engine may employ several techniques to analyze data, including deterministic computational methods, statistical methods, neuronal networks, and self-learning algorithms. The Analytics Engine instructs the Task Manager to schedule data collections.

The Sensor Domain Manager (53) has an Interface (61), to provide a mean for communication and data exchange with its components. For instance, Interface (61) may provide access to the data stored in the Data Store (58), or provide a mean to update the Analytics Engine (55), such as with a new statistical model used in algorithms for data analysis.

A workload is a set of one or more jobs to be performed on a sensor device. A job is a request to a controller of the sensor device. Examples of jobs are requests for the recording of signals, sending cached data, or maintenance tasks, such as generating and sending diagnostics data or performing firmware upgrades. For instance, in FIG. 2, assuming that sensor set (25) contains magnetic sensors, a job may be to instruct controller (22) to initiate the recording of signals generated by magnetic sensors in (25), and further process them to obtain converted signals, to be stored by (22). Other example of a job is to request (22) to initiate sending of all stored set of converted signals to the Sensor Domain Manager (53) in FIG. 3, or sending an instruction to component (35), the operating system, to perform a collection of log data. A job that requests for the recording of signals generated by one or more sensors and further processing of them to obtain converted signals may contain a start time and duration for the recording, and in addition a frequency and duration for recording intervals may be given, if the recording of signals is to be performed periodically for the duration of the job. For instance, a workload may entail two jobs, one to record signals by magnetic sensors every 60 seconds, for a duration of ten seconds, and another to record the intra-pipe pressure every five seconds, for a time interval of ten minutes. Jobs that belong to a workload may be performed in any time wise relation to each other, such as concurrently or serially, or a specific start time may be specified for a job. A job may be performed conditionally, for instance depending on the results or exit code of a previous job.

The sensor device may implement a model to assign a cost to a given workload that is to be performed. The cost of a workload is a numeric value that models the usage of certain hardware resources that the workload requires. Hardware resources considered in the model for cost are those that age with usage, or can be depleted. For instance, a request to perform a recording of signals by a sensor and generating a converted signal requires electrical energy. The model for the cost of a workload may include the predicted charge level of batteries at dates after workload completion. For instance, performing aforementioned workload for a given length of time requires a predictable amount of electrical energy, and the cost of it takes into account how long it will take to restore batteries to a given charge level. Thus, according to this model, the cost of a workload increases with energy usage, and also with the predicted time it takes to restore the charge state of a battery, making for instance a workload that is completed during hours with little or no sunlight more expensive than a workload that is completed at a time when ample daylight exists to provide for the recharging of batteries. A model for the cost of a given workload may also take into account a degradation of lifetime of electronic or other components of the sensor device. For instance, a workload may include a job to generate a converted signal from data recorded by a sensor, and store the converted signal. If storage is performed on a medium that has a maximum number of erase cycles, such as an SSD storage device, the cost of the workload may include the wear incurred on the SSD device by the storage operation. Similarly, for most types of rechargeable batteries, the process of charging and recharging incurs a loss of capacity. Aside the time required to restore a charge level of a battery, a model for the cost of a workload also may consider the battery wear incurred by a recharge of the battery. Battery wear depends on the batter type, and for some types also on the charge level. For instance, a NiCd battery can be subjected to a higher number of recharge cycles before losing capacity than a Li-ion battery, deep discharge cycles accelerate the loss of capacity for Li-ion batteries. A model that considers battery wear in the cost of a workload may differentiate between battery types and for battery types for which a deep discharge should be prevented also the charge level when a workload is started.

A workload group is a set of workloads, whereby each workload is assigned to be performed by a sensor device. The entirety of sensor devices that have a set of workloads of a workload group assigned is called the domain of a workload group. The workloads of a workload group typically are correlated. For instance, a workload group may instruct a set of sensor devices to record the current rate of throughput during a specified time interval, and the workload group is a sets of identical workloads, each assigned to one device of the domain of the workload group.

Workloads of a workload group may be performed conditionally. For instance, a workload group may describe the request to record the current rate of flow for a time interval on a subset of sensor devices of its domain, e.g. if 80% of sensor devices of the domain can perform their assigned workload with a cost that is below a maximum threshold, which may be specific to a sensor device. If this condition is met, the workload group is performed, and either all sensor devices may participate in it or a sensor device of the domain participates in it only if it can perform its assigned workload with a cost that is below the specified threshold. Another example is a set of sensor devices, one situated at an ingress point and others at egress points, starting to record the current rate of flow for a time interval, if the intra-pipe pressure at the egress point exceeds a threshold.

The actions performed during a workload belonging to a workload group and the duration of each workload may be determined by means of a voting algorithm. For example, the goal of a workload group may be to perform monitoring of the current rate of flow as long as possible, performed concurrently by a set of sensor devices, depending on the energy reserves of them. The sensor devices that belong to the domain of the workload group may vote to determine the duration for which to run a given workload, based on the available energy reserves of sensor devices. The voting algorithm is performed by a set of devices that includes the sensor devices belonging to the domain of the workload group and possibly the Sensor Device Manager. The voting algorithm entails one or more steps of message exchanges between the devices that participate in it. Steps of the voting algorithm may be for instance multicasts, one device sending a message to a subset of devices of the domain, informing about its state, or a device sending a message to one other device.

The sensor devices also may perform voting algorithms during the execution of workloads of a workload group, to determine for each sensor device the actions performed during the workload assigned to it. For instance, the sensor devices of the domain may communicate to exchange information about their state to determine which action a device of the domain will perform next. For instance, the devices of the domain may perform a workload for a specified duration of time, and then based on the obtained results, such as measurements calculated from signals recorded by sensors, perform a voting algorithm to decide for each sensor device of the domain, whether it should continue performing its assigned workload, or do so with changed parameters. For instance, the devices of a domain each may have two vibration sensors, V1 and V2, the workload assigned to each may entail recording signals generated by one of its vibration sensors, V1 or V2, and then possibly continue to do so for the other sensor. The sensor devices collectively may sample for the occurrence of vibration signals in a given frequency range, detected by sensor V1, and if none are detected switch to recording signals generated by sensor V2. After each device has performed the recording of signals generated by V1 for a time period, a voting protocol is run, during which the devices inform each other about the vibration signals generated by each of its sensors V1, and depending on the result decide that a subset of sensors devices of the domain or all devices should switch to recording the signals generated by using V2.

The Sensor Domain Manager (53) may maintain a database, the pipe configuration database, that contains information about the pipe infrastructure, such as about the topology and geometry of the pipe system, its geographic location, and the location of flow meters, valves, and sensor devices. The pipe configuration database may be stored in the Data Store (58). The pipe configuration database may be supplied during initialization and configuration of the Sensor Domain Manager (53). For instance, the Sensor Domain Manager may read a database or a file that contains the information to build the pipe configuration database. Information that is to be added to the pipe configuration database may also be obtained during a discovery process. For instance, a sensor device may transmit information advertising its geographic location, device type, or serial number. The sensor device may for instance broadcast this information, and the Sensor Domain Manager (53) upon receipt adds it to the pipe configuration database.

The Analytics Engine (55) in FIG. 3, runs threads or processes to obtain information about the state of the pipe infrastructure. For this, the Analytics Engine determines workloads or workload groups to be run by sensor devices, to obtain measurements, for instance of the current rate of flow, intra-pipe pressure and occurrence of vibration signals at a sequence of dates and probe points.

The Analytics Engine (55) processes the information generated by the sensor devices to obtains data that describe the behavior of the pipe infrastructure and observed measurements, thus creating a history record of measurements. The history record typically is stored in a database, for instance in Data Store (58) in FIG. 3. The history record may include typical rates of throughput, measured at various probe points, associated with a time of day, observed vibration signals associated with flow volumes in a pipe segment, vibration signals occurring at a time of day or in a pipe segment, or recordings of the occurrence of backpressure. Further, the history record may include information about the state of sensor devices, such as information about the capacity of its battery, which deteriorates as the battery ages. The history record may include information that is indicative of a potential failure or defect of a legacy flow meter, supplied with a retrofit device, or the likelihood of such failure occurring in future. For instance, the history record may contain information concerning how often a legacy flow meter has been subjected to back pressure, since backpressure typically increase the risk of a premature failure of a flow meter. If a sensor device is a retrofit device for a legacy flow meter having a gear box, the history record also may include a sampling of vibration signals observed at the gearbox of the legacy device, since defects in a gear box typically can be detected by characteristic vibration signals.

Based on information in the pipe configuration database, the Analytics Engine (55) of FIG. 3 generates workloads or workload groups to be run on the sensor devices. Such workloads or workload groups may be formulated according to a syntax or metalanguage suited to describe them. The Analytics Engine (55) forwards the workload groups to the Task Manager (60), which manages their execution. The Task Manager forwards to each sensor device belonging to the domain of a given workload group its assigned workload. The Task Manager then monitors the execution of the workload group. For instance, the Task Manager may query a sensor device that belongs to the domain of a workload group for status, and it may participate in voting protocols that are performed in the course of executing the workload in the workload group. In the course of executing a workload and after its completion, the sensor devices may send information to the Sensor Domain Manager (53), such as the return status of commands, and data generated during workload execution, such as measurements. These data are stored in a database, that may be managed by Data Store (58), and the Task Manager (60) may coordinate the forwarding to data from the sensor devices and storing them in a database. The Task Manager (60) informs the Analytics Engine (55) about the completion of a workload or workload group, the return status of commands, and data collections performed for a job of a workload. If a workload group could not be performed and has been rejected, the Task Manager (60) will inform the Analytics Engine (55) about the reason for rejection. For instance, a reason for rejection may be that a workload of the workload group could not be performed within specified limits for cost, set for one or more devices. The Analytics Engine (55) in response may formulate a new set of workloads that can be performed within the set cost limit.

The Analytics Engine (55) may generate sets of workload group towards several goals. For instance, to increase a data set used for statistical analysis, the Analytics Engine, during daytime, when the cost of a workload is low, since the batteries of a sensor device will recharge quickly during daylight, may generate workload groups for routine collections of signals by sensors, such as vibration sensors of sensor devices.

The Analytics Engine (55) may generate workload groups to generate a database that contains measurements by sensors that are typically observed.

The Analytics Engine (55) may generate workload groups to monitor the behavior of the pipe system with the goal to detect abnormalities, such as pipe leaks, or defect flow meters or sensor devices. The Analysis Engine (55) may run such workload groups routinely, taking into account the cost of a workload group. The Analytics Engine (55) may employ various algorithms for diagnostics in the pipe system. It may run for instance deterministic algorithms, statistical algorithms, or self-learning algorithms for the detection of pipe leaks.

A deterministic algorithm to detect a pipe leak in a given pipe segment for instance may measure the throughput at all ingress points and at all egress points during a time interval, determine the sum of cumulative throughput for that time interval for all ingress points, and the cumulative throughput for that time interval for all egress points, and comparing the two sums. If, up to a tolerance margin, the sum of cumulative throughputs of all ingress point is larger than the respective sum for egress points, it is concluded that a pipe leak exists at a location in that pipe segment.

A statistical algorithm analyzes data sets recorded during a known state of the pipe system and attempts to establish a correlation between that state and signals observed by sensors of sensor devices during that state. For instance, by means of deterministic methods, a pipe leak has been established to exist in a pipe segment, and the volume of water loss per time unit may be known. Recordings of signals of vibration sensors belonging to sensor devices in that pipe segment have been performed while the leak is present, and as well recordings of signals of these sensors while no pipe leak exists. By means of statistical analysis, data that are characteristic for the presence of a pipe leak are determined. Such data for instance are the presence of signals generated by vibration sensors (e.g. vibration sensor 6 of FIG. 1) that correspond to vibrations in a certain spectrum of frequencies and amplitude. The latter also may be dependent on intra-pipe pressure, and the statistical model may include recordings of intra-pipe pressure. Then, from the presence or absence of such data patterns that have been deemed characteristic for whether or not a pipe leak exists, it is concluded if the signals recorded by sensors of a set of sensor devices during a time window are indicative of the presence or absence of a pipe leak.

A statistical algorithm in its model to establish the state of a given pipe segment also may use data sets that have been generated on other pipe segments, called control pipe segments, that are deemed to be sufficiently similar to former pipe segment. I.e., the signals generated by vibration sensors on the control pipe segments are assumed to have similar characteristics like the ones of the pipe segment that is to be analyzed. For instance, the frequencies calculated from signals of vibration sensors are in ranges that are deemed to be similar with regards to frequency or amplitude. Several factors may be taken into account in determining the characteristics of a pipe segment suited to serve as control pipe segment for another pipe segment, including the material and diameter of the pipe, pipe geometry and length, the consistency of ambient soil, if the pipe is installed below ground level, and vibration signals generated by the ambient environment, for instance streets or buildings that are situated in proximity.

The Sensor Domain Manager (53) may import data sets recorded by sensor devices installed on another pipe infrastructure into a database, for instance managed by Data Store (58), and use these data for statistical analysis.

The Analytics Engine (55) may employ a self-learning algorithm to continually improve a model that predicts states of a pipe system based on signals observed by sensors belonging to sensor devices. Self-learning entails that a model is continually adjusted as new data are collected. For instance, a statistical model for the characteristics of vibration signals that are indicative of a pipe leak may be improved by incorporating new data, that extend the set of sample measurements collected so far. A self-learning algorithm also may employ techniques used in neuronal networks or pattern recognition to perform an analysis of the pipe system for leak detection.

The Analytics Engine (55) may continually schedule workload groups to collect data, to expand the set of sample data of sensor signals recorded in the pipe system, thus improving the quality of data obtained by statistical analysis or self-learning algorithms. In the scheduling of workload groups, the Analytics Engine (55) may employ a model for costs of a workload that, aside the use of hardware resources on the sensor device, also takes into account the priority of a data collection to improve a statistical model and the cost of performing that calculation on a sensor device.

The Analytics Engine (55) may also receive requests to perform workloads, such as the analysis of a pipe segment to determine if water leaks exist, or defects of sensor devices, or defects of legacy flow meters that are equipped with a retrofit device. The Analytics Engine (55), for instance by means of a set of commands or invoked functions, that are part of an Application Programming Interface (API), may obtain instructions how to generate data that are to be used by an algorithm for analysis, or the Analytics Engine (55) may determine a workload group that is suited to generate data to analyze a specified condition. For instance, the Analytics Engine (55) may be instructed to obtain recordings of the current rate of flow and from signals generated by vibration sensors for a specified set of sensor devices, time interval and sampling frequency. Such detailed instructions, for instance, may be given when the operator of the pipe system plans to control the intra-pipe pressure during the duration of a data collection. Alternatively, the Analytics Engine (55) may just obtain the instruction to perform analysis for pipe leaks for a segment of the pipe system, then construct workload groups and elect a schedule when to run the workload groups. For instance, the Analytics Engine (55) may determine a workload groups to be run and then consult a database of signals or measurements previously recorded by sensor devices and a database containing a history of state information for sensor devices, to determine a time interval during which the sensor devices most likely can perform that workload group, not exceeding a set cost.

Data generated from signals that are recorded by sensor devices may be used for many purposes. Aside using the recorded data for the detection of water leaks and pipe defects, by the Analytics Engine (55), the recorded data typically contain information about the cumulative throughput of sensor devices, used for auditing purposes and for billing customers of a pipe infrastructure. In addition, workload groups may be scheduled on sensor devices of a pipe system on behalf of other parties. For instance, a sensor device typically will contain sensors to measure vibration signals and the ambient temperature. A pipe system that is a municipal water supply infrastructure, if equipped with sensor devices yields a multitude of measuring points for vibration signals and temperature in a geographic region extending over a part or an entire city. These data may be of interest for other parties, aside the operator of the water supply infrastructure. For instance, they may be of interest for a weather forecast service, construction company or insurance provider. The Sensor Domain Manager (53) may perform the execution of scheduled workload groups for data collections on demand by a third party. For instance, a third party may request to obtain temperature readings performed by all sensor devices at specified time intervals. Another example is a construction company that performs work in proximity to the pipe infrastructure to record signals generated by the vibration sensors of a select set of sensor devices. The Sensor Domain Manager (53) will instruct its Task Manager (60) component, to schedule workload groups to perform such data collection.

To prioritize the scheduling of workload groups, the Task Manager (60) in its model to schedule workloads does not only consider the cost associated with a workload group, but also the priority of a data collection. For instance, the operator of the pipe infrastructure may be required to determine the location of a water leak and issue a request for analysis of a pipe segment for water leaks during a given time window, assigning it a high priority. The Analytics Engine creates one or more workload groups, each to be performed by a set of sensor devices, and assigns a high maximum cost to each, reflecting the high priority of the data collection. A sensor device belonging to the domain of a workload group may have low energy reserves, but according to the high maximum cost associated with the workload it is requested to perform, will accept the workload, even at the risk of exhausting its battery power, if the maximum cost is sufficiently high, and it will not be able to perform further tasks before the charge levels of its batteries have recovered. Thus, assigning a priority to a data collection is another mean to determine a maximum cost associated with a workload that is assigned to a sensor device.

The Sensor Device Management Domain also may include portable devices that are used for data collections. In FIG. 3. M1, (62), may be a portable device. A portable device can be dynamically added to a Sensor Device Management Domain Like a sensor device, a portable device is capable of communicating with the Sensor Domain Manager (55), may be a device that belongs to the domain of a workload group, and may participate in peer-to-peer protocols. A portable device may be equipped with a GPS and capable of transmitting its location to the Sensor Domain Manager (53). One a portable device has registered with the Sensor Domain Manager, the Analytics Engine (55) or Task Manager (60) may include it into the domain of a workload group. A portable device may be equipped with various sensors, including vibration sensors, magnetic sensors, and sensors to measure temperature or humidity.

A portable device may as well be equipped with components to create sound waves, and may have multiple such components, each capable of creating sound waves in a certain frequency range. Generating sound waves may be a job in a workload that a portable device performs when being part of the domain of a workload group, and participating in the execution of workloads. For instance, while executing a workload group, a portable device may be situated in proximity or close contact with a pipe and generate sound waves, while other devices record vibration signals.

A Sensor Device Management Domain may implement multi-tenancy. The Audit Blockchain application describes an implementation for multi-tenancy in a domain of IoT devices. The devices that are part of the Sensor Device Management Domain in FIG. 3, devices P1, . . . , P8, M1 and the Sensor Domain Manager (53) may support access by multiple users and a use of the services provided by components (54), . . . , (61), ensuring access privileges for users.

What is claimed is:

1. A system of sensor devices connected to a pipe system transporting a fluid, comprising:
a plurality of sensor devices operatively coupled to the pipe system to collect measurements related to one or more of the following: vibration, magnetic field, fluid pressure, temperature, humidity, chemical compensation of the fluid, fluid flow or fluid throughput;
each sensor device having a power source, a current energy status and a network connector;
a network connecting a number of said sensor devices through said network connectors;
a controller connected to the network and to the number of sensor devices and to a database containing (i) current energy status of a sensor device battery power source, and (ii) a cost of a workload relating to use of a sensor device;
the controller being operable to assign one or more workloads to one or more of said number of sensor devices based on at least said cost of a workload relating to use of a sensor device, where said cost includes energy used from said sensor device battery power source in performing said workload and time to restore energy to said sensor device battery power source after performing said workload,
the controller being operable to command operation of one or more of said number of sensor devices based on said assigned workloads by communicating through the network to said sensor devices.

2. The system of claim 1, said current energy status comprising charge status of said sensor device battery power source.

3. The system of claim 1, further comprising said cost of a workload comprising wear schedule of a sensor device before required maintenance and a cost of the required maintenance.

4. The system of claim 1, further comprising said cost of a workload comprising wear schedule of at least one of said sensor devices before failure of said at least one sensor device.

5. The system of claim 1, said assigned workloads also based on priority of workload.

6. The system of claim 1, an assigned workload being performed conditionally based at least in part on a fluid pressure in the pipe system.

7. The system of claim 1, one of said assigned workloads comprising fluid flow rate at a location in the pipe system.

8. The system of claim 7, an assigned workload being performed conditionally based at least in part on said fluid flow rate, said workload comprising determining flow rate at said location over a time interval to determine fluid throughput in the pipe system.

9. The system of claim 7, an assigned workload being performed conditionally based at least in part on said fluid flow rate, said workload comprising determining fluid throughput at another location and comparing the fluid throughput at the locations to determine fluid leaks.

10. The system of claim 1, wherein said controller communicates through the network to a sensor device using a peer to peer scheme.

11. The system of claim 1, the pipe system comprising a municipal potable water distribution system and the sensor devices being distributed over a wide geographic area.

12. The system of claim 1, said workload comprising one or more jobs comprising recording sensor signals, sending cached data, performing maintenance tasks.

13. The system of claim 1, said cost comprising one or more of predicted battery charge after workload completion, wear of components, battery charge level restoration, loss of battery capacity.

14. A method of operating a network of sensor devices connected to a pipe system transporting a fluid, comprising:
determining an energy status of a battery power source connected to a number of said sensor devices;
assigning a scheduled workload for one or more sensor devices based at least on a cost of a workload relating to use of a sensor device, where said cost includes energy used from said sensor device battery power source in performing said scheduled workload and time to restore energy to said sensor device battery power source after performing said scheduled workload; and
communicating the scheduled workload to a sensor device if said cost is below a threshold level.

15. The method of claim 14, the assigned workloads of said sensor devices comprising collecting measurements related to one or more of the following: vibration, magnetic field, fluid pressure, temperature, humidity, chemical compensation of the fluid, fluid flow or fluid throughput.

16. The method of claim 15, recording the measurements in a database and analyzing said measurements to determine a current state of the pipe system.

17. The method of claim 14, determining the energy status at least one of said sensor devices based at least in part on a charge status of said battery power source powering said at least one sensor device.

18. The method of claim 14, determining said cost of a workload based on a wear schedule of a sensor device before required maintenance and a cost of the required maintenance.

19. The method of claim 14, using said assigned workload for determining one or more of—back pressure in the pipe system, fluid flow rate at a location in the pipe system, fluid throughput in the pipe system, fluid leaks.

* * * * *